(12) United States Patent
Kato et al.

(10) Patent No.: US 10,845,539 B2
(45) Date of Patent: Nov. 24, 2020

(54) OPTICAL MODULATOR

(71) Applicant: SUMITOMO OSAKA CEMENT CO., LTD., Tokyo (JP)

(72) Inventors: Kei Kato, Tokyo (JP); Norikazu Miyazaki, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 16/290,969

(22) Filed: Mar. 4, 2019

(65) Prior Publication Data
US 2019/0271809 A1 Sep. 5, 2019

(30) Foreign Application Priority Data
Mar. 5, 2018 (JP) ................................. 2018-038744

(51) Int. Cl.
| | |
|---|---|
| *G02B 6/125* | (2006.01) |
| *G02B 6/14* | (2006.01) |
| *G02F 1/225* | (2006.01) |
| *G02F 1/035* | (2006.01) |

(52) U.S. Cl.
CPC .............. *G02B 6/125* (2013.01); *G02B 6/14* (2013.01); *G02F 1/035* (2013.01); *G02F 1/225* (2013.01); *G02F 2201/05* (2013.01)

(58) Field of Classification Search
CPC G02B 6/125; G02B 6/14; G02F 1/035; G02F 2201/05
See application file for complete search history.

(56) References Cited

U.S. PATENT DOCUMENTS

| | | | | |
|---|---|---|---|---|
| 4,768,848 A | * | 9/1988 | Vaerewyck | G02F 1/225 385/129 |
| 5,127,081 A | * | 6/1992 | Koren | G02B 6/125 385/130 |
| 6,400,490 B1 | * | 6/2002 | Hosoi | G02F 1/225 359/254 |
| 2003/0147591 A1 | * | 8/2003 | Doi | G02F 1/0123 385/39 |
| 2008/0267564 A1 | * | 10/2008 | Han | G02B 6/12004 385/45 |

(Continued)

FOREIGN PATENT DOCUMENTS

JP 2016191820 11/2016

*Primary Examiner* — Thomas A Hollweg
*Assistant Examiner* — Mary A El-Shammaa
(74) *Attorney, Agent, or Firm* — JCIPRNET

(57) ABSTRACT

An optical modulator capable of curbing deterioration of transmission properties due to deformation of a housing is provided. Provided is an optical modulator including a substrate (10) on which an optical waveguide (20) is formed and a housing (30) that accommodates the substrate, in which the optical waveguide includes mode conversion branching portions (21, 22) which convert a mode of light waves propagating through the optical waveguide and branch the light waves, a mounting portion (32) protruding from a surface (31) inside the housing and holding the substrate is formed, and the substrate is fixed to the mounting portion in an arrangement in which a fixed end (33) between the substrate and the mounting portion is positioned outside a region including the mode conversion branching portions when the substrate is seen in a plan view.

3 Claims, 5 Drawing Sheets

(56) References Cited

U.S. PATENT DOCUMENTS

| | | | |
|---|---|---|---|
| 2010/0284644 A1* | 11/2010 | Sugamata | G02F 1/225 385/2 |
| 2014/0240509 A1* | 8/2014 | Nakayama | B82Y 20/00 348/162 |
| 2020/0033692 A1* | 1/2020 | Katou | G02F 1/0018 |

* cited by examiner

OPTICAL MODULATOR

CROSS-REFERENCE TO RELATED APPLICATION

This application claims the priority of Japan patent application serial no. 2018-038744, filed on Mar. 5, 2018. The entirety of the above-mentioned patent application is hereby incorporated by reference herein and made a part of this specification.

BACKGROUND

Technical Field

The present disclosure relates to an optical modulator in which a substrate having an optical waveguide formed thereon is accommodated in a housing.

Description of Related Art

In optical communication fields, optical modulators performing optical modulation on input light waves in accordance with transmission data or the like and outputting light waves have been used. FIG. 1 shows a structure of an optical modulator of the related art. An upper portion of FIG. 1 is a plan view of a substrate of an optical waveguide element, and a lower portion is a cross-sectional view including a box-shaped housing that accommodates the substrate.

The optical modulator includes an optical waveguide element configured such that an optical waveguide 20 including a Mach-Zehnder waveguide for performing optical modulation is formed on a substrate 10 having an electro-optical effect. A mounting portion 32 is formed on a bottom surface 31 of a housing 30 of the optical modulator so as to protrude on an inner space side, and the substrate 10 of the optical waveguide element is fixedly disposed on the mounting portion 32.

The optical waveguide 20 includes a plurality of Y branched waveguide portions 21 that distribute light waves propagated through an optical waveguide at a uniform power ratio in order that a plurality of Mach-Zehnder waveguides can be arranged parallel to each other. In addition, a mode conversion portion 22 for converting a light wave mode before branching light waves is disposed on an upstream side of the Y branched waveguide portions 21 in a light wave moving direction. For example, the mode conversion portion 22 may have a structure in which an optical waveguide width gradually widens (tapered structure) in order to branch one optical waveguide into two parts.

In general, the mounting portion 32 is formed such that an end on a light input portion side to which an optical fiber 40 is connected is closer to a downstream side in a light wave moving direction than an end on a light input portion side of the substrate 10. That is, the substrate 10 is fixed to the mounting portion 32 in such a manner that the end on the light input portion side protrudes from the mounting portion 32 to the upstream side in the light wave moving direction. Such a structure is adopted in order to secure workability and the like when the optical fiber 40 drawn into the housing 30 is connected and fixed to the substrate 10. In addition, a portion of the substrate 10 connected to the optical fiber 40 is reinforced by a reinforcing member 12 in order to increase the strength of connection to the optical fiber 40.

The housing 30 is airtightly sealed by a lid (not shown) after the substrate 10 is accommodated in and fixed to the housing. However, deformation such as warping or twisting may occur in the housing due to a thermal history in a manufacturing process such as seam welding for airtight sealing, a change in temperature of an operation environment of the optical modulator, and the like. When such deformation occurs, the substrate 10 fixed to the housing 30 receives an external force from a contact surface (fixation surface) with respect to the housing 30.

In recent years, as shown in the cross-sectional view which is a lower portion of FIG. 1, a structure in which a fixed end (a mounting side of the optical waveguide element) 33 between the substrate 10 and the housing 30 on the light input portion side is superimposed on the range of the mode conversion portion 22 has been provided. In this manner, when a portion (fixed portion) being in contact with the housing 30 and a portion not being in contact with the housing are included in the range of the mode conversion portion 22, a point at which there is great change in stress (stress distribution) occurs in the mode conversion portion 22 due to an external force applied from the housing 30.

Then, a refractive index distribution occurs in the range of the mode conversion portion due to a change in stress, and a difference occurs in a branching ratio (power ratio) of propagated light between the Y branched waveguide portions. As a result, deterioration of an On/Off extinction ratio in the Mach-Zehnder waveguides and a loss difference between the branched waveguide portions (arm portions of the Mach-Zehnder waveguides) occur, which leads to deterioration of transmission properties. Further, since a substrate such as an LN substrate (lithium niobate substrate) used for an optical modulator has an excellent piezoelectric effect, a polarization proportional to pressure also occurs at the same time when an external force is applied, a refractive index of a portion having received pressure changing more prominently. Note that various structures for stabilizing a branching ratio in a Y branched structure have been examined, and for example, Japanese Patent Application Laid-Open No. 2016-191820 discloses a structure in which a three-branched structure and a slab waveguide are disposed as a portion before the Y branched structure.

SUMMARY

The disclosure provides an optical modulator capable of curbing deterioration of transmission properties due to deformation of a housing.

According to an embodiment, an optical modulator has the following technical features.

(1) An optical modulator including a substrate on which an optical waveguide is formed, and a housing which accommodates the substrate is provided. The optical waveguide includes a mode conversion branching portion that converts a mode of light waves propagating through the optical waveguide and branches the light waves. A mounting portion protruding from a surface inside the housing and holding the substrate is formed, and the substrate is fixed to the mounting portion in an arrangement in which a fixed end between the substrate and the mounting portion is positioned outside a region including the mode conversion branching portion, when the substrate is seen in a plan view.

(2) In the optical modulator according to (1), the optical waveguide includes a plurality of mode conversion branching portions, and the substrate is fixed to the mounting portion in an arrangement in which a fixed end between the substrate and the mounting portion is positioned outside a region including a mode conversion branching portion on a side furthest upstream furthest upstream in a light wave moving direction, when the substrate is seen in a plan view.

(3) In the optical modulator according to (2), a concave portion extending in a direction perpendicular to the light wave moving direction is formed in the mounting portion, and the concave portion is formed such that a region of any one mode conversion branching portion other than the mode conversion branching portion on the side furthest upstream in the light wave moving direction fits into the concave portion, when the substrate is seen in a plan view.

DESCRIPTION OF THE EMBODIMENTS

Figure 1:
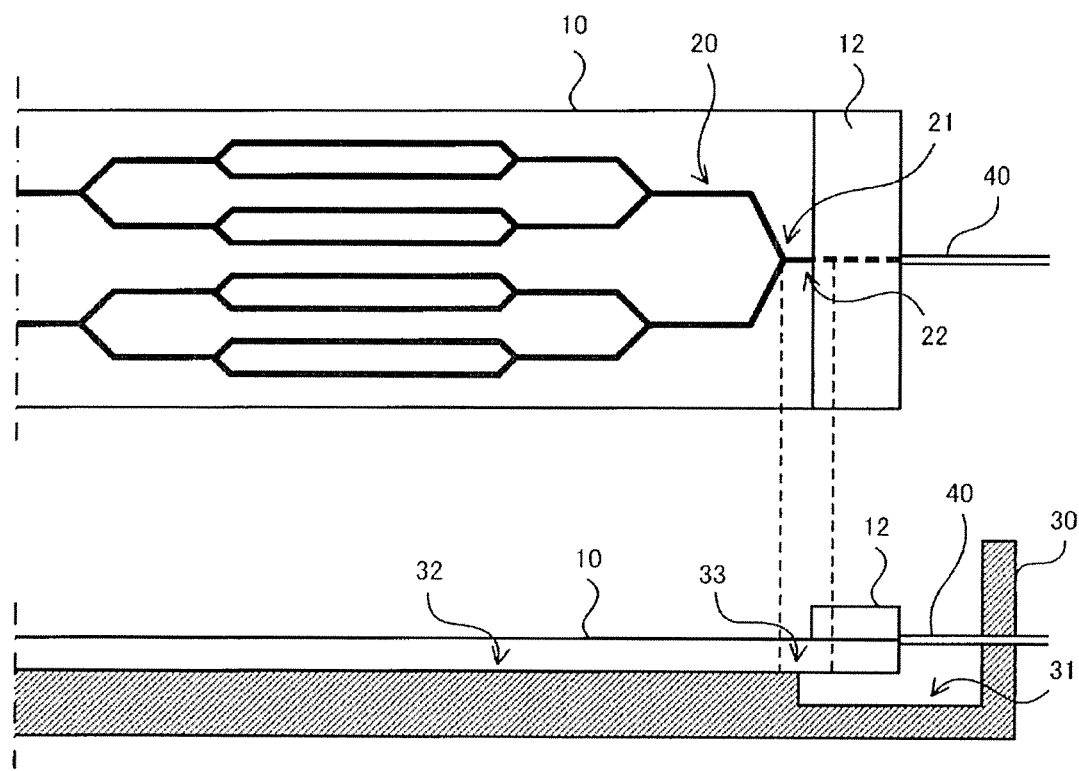
FIG. 1 is a diagram showing a structure of an optical modulator of the related art.

An optical modulator according to the present disclosure will be described in detail using examples. Note that the present disclosure is not limited to the following examples. The optical modulator according to the present disclosure includes a substrate (10) on which an optical waveguide (20) is formed and a housing (30) that accommodates the substrate as shown in FIGS. 2 to 6. In the optical modulator, the optical waveguide includes mode conversion branching portions (21, 22) which convert a mode of light waves propagating through the optical waveguide and branch the light waves, a mounting portion (32) protruding from a surface (31) inside the housing and holding the substrate is formed, and the substrate is fixed to the mounting portion in an arrangement in which a fixed end (33) between the substrate and the mounting portion is positioned outside a region including the mode conversion branching portions when the substrate is seen in a plan view. In other words, the substrate is fixed to the mounting portion such that a boundary of a bonding region in which the substrate and the mounting portion are bonded to each other does not overlap the mode conversion branching portion when the substrate is seen in a plan view.

According to such a structure, a point at which there is great change in stress (stress distribution) due to an external force applied from the housing does not occur within the range of the mode conversion branching portion, and thus it is possible to curb occurrence of a difference in a branching ratio of propagated light when light waves are branched. As a result, deterioration of an On/Off extinction ratio in Mach-Zehnder waveguides and occurrence of a loss difference between branched waveguide portions can be reduced, and thus it is possible to curb deterioration of transmission properties. The present disclosure is particularly suitable for an optical modulator using a substrate having an excellent piezoelectric effect like an LN substrate, but the present disclosure is also effective for an optical modulator using another substrate (a substrate such as glass or crystal) in which a refractive index changes when pressure is applied.

A bottom surface facing a lid for airtightly sealing a housing is generally used as a surface (a surface on which a substrate is mounted) inside a housing on which a mounting portion of a substrate is formed, but the present disclosure is not limited thereto. For example, the mounting portion of the substrate may be formed on a side surface adjacent to the lid. Hereinafter, for convenience of description, a case where a mounting portion of a substrate is formed on a bottom surface of a housing will be described as an example.

A mounting portion of a substrate has a planar mounting surface formed to be in uniform contact with the surface of the substrate so as to firmly fix the substrate. The mounting surface may be constituted by a single plane region, or may be constituted by a plurality of plane regions partitioned by groove-like concave portions or the like.

Figure 7A:
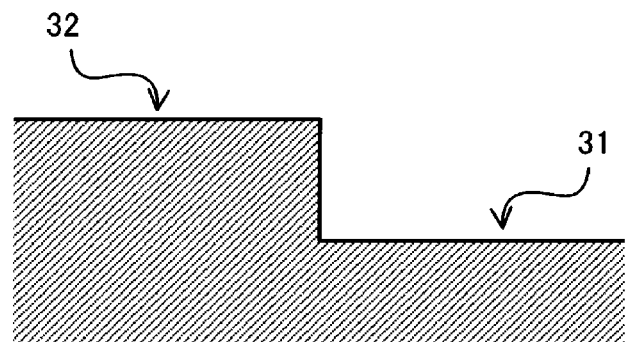
FIG. 7(a) to FIG. 7(c) are diagrams respectively showing an example of a cross-sectional structure of an end of a mounting portion.
Figure 7B:
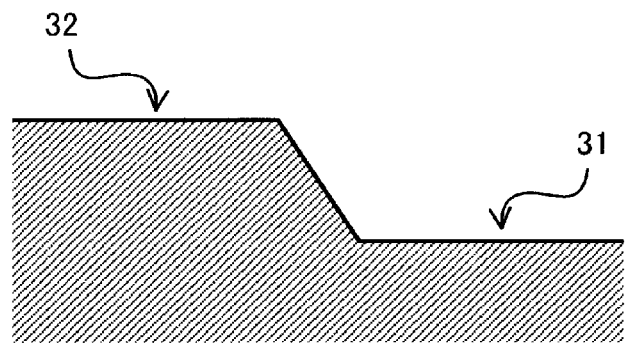
Figure 7C:
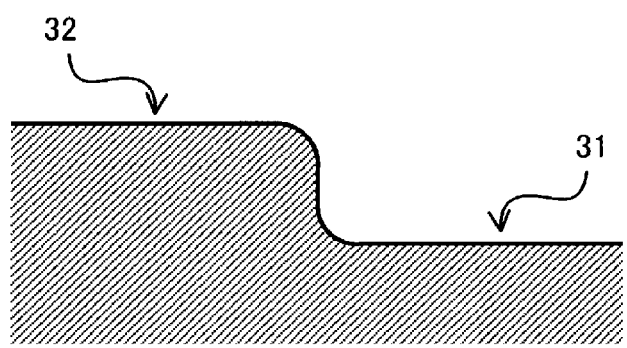

In addition, the mounting portion of the substrate has a side surface (wall surface) connecting the mounting surface and the bottom surface of the housing. The side surface of the mounting portion may be formed at right angles to the bottom surface and the mounting surface of the housing as shown in FIG. 7(a), or may be formed obliquely to the bottom surface and the mounting surface of the housing as shown in FIG. 7(b). Note that a connection portion between the side surface of the mounting portion and the bottom surface and the mounting surface of the housing may be a rounded shape as shown in FIG. 7(c).

The fixed end is an end of a region in which the substrate is fixed to the mounting portion (mounting surface). Since the mounting portion of the substrate and the substrate disposed thereon are fixed using an adhesive or the like, an end of a region in which the substrate comes into contact with the adhesive can also be referred to as a fixed end. That is, the fixed end corresponds to a boundary of a bonding region in which the substrate and the mounting portion are bonded to each other. Although this fixed end is present on each of an upstream side and a downstream side in a light wave moving direction and each of the left side and the right side with respect to the light wave moving direction, the fixed end in the present disclosure mainly refers to the fixed end on the upstream side in the light wave moving direction (a fixed end on a light input portion side). Note that it is needless to say that it is preferable to dispose the other fixed ends (the boundary of the bonding region) so as not to overlap the mode conversion branching portions.

The mode conversion branching portions include, for example, a mode conversion portion (22) converting a mode of light waves and a Y branched waveguide portion (21) branching the light waves having been subjected to the mode conversion. Further, in a case where a section in which a waveguide width changes is present immediately behind the Y branched waveguide portion, the section may also be included in the mode conversion branching portions. That is, as an example, the mode conversion branching portions according to the present disclosure are constituted by a Y branched waveguide portion and sections (sections with an unstable mode) which are provided before and after the Y branched waveguide portion and in which a mode of light waves changes. When a refractive index changes in such a mode conversion branching portion, the center position of distribution of light waves propagating through the optical waveguide is shifted, the distribution becomes asymmetric, or combination with another desired mode is made, and thus the distribution of the light waves propagating through the optical waveguide becomes unstable. Consequently, in the present disclosure, a structure in which hardly any external force is applied to the mode conversion branching portion from the housing is adopted, and a change in refractive index in the mode conversion branching portion is curbed, thereby eliminating instability of distribution of light waves propagating through the optical waveguide.

Figure 8A:
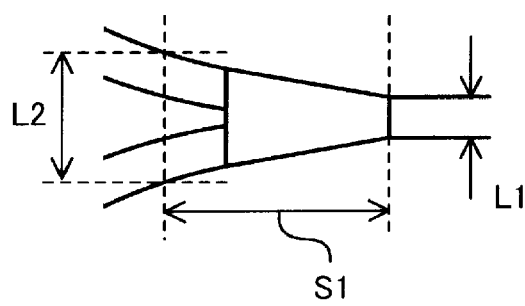
FIG. 8(a) to FIG. 8(c) are diagrams respectively showing an example of a structure of a mode conversion branching portion.
Figure 8B:
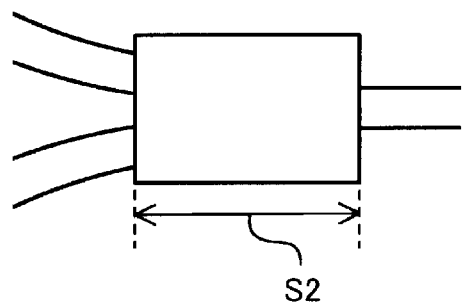
Figure 8C:
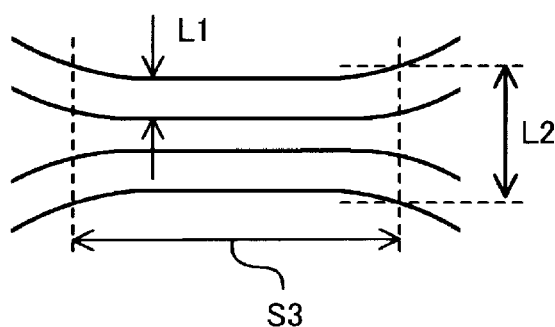

The mode conversion branching portion can be realized to have various structures as shown in some examples of FIG. 8(a) to FIG. 8 (c). FIG. 8(a) shows an example of a mode conversion branching portion in a Y branched structure, and the mode conversion branching portion has a shape in which the width thereof gradually widens in the course of reaching a branched portion (tapered shape). In a case of such a structure, a section S1 in which a total width L2 of two optical waveguide portions after branching is equal to or less than three times a width L1 (a width of a portion not having a tapered shape) of a usual optical waveguide (L2≤L1×3) corresponds to a mode conversion branching portion. FIG. 8(b) shows an example of a mode conversion branching portion based on a multi-mode interferometer (MMI) structure, and the mode conversion branching portion has a shape in which a predetermined section before a branched portion widens to have a width allowing multi-mode wave guiding. In a case of such a structure, a section S2 of which the width is widened corresponds to a mode conversion branching portion. FIG. 8(c) shows an example of a mode conversion branching portion based on a directional coupler, and two optical waveguides are brought close to each other over the predetermined section. In a case of such a structure, a section S3 in which the total width L2 of a portion in which two optical waveguides come close to each other is equal to or less than three times the width L1 of the usual optical waveguide (L2≤L1×3) corresponds to a mode conversion branching portion, similar to the case of the Y branched structure. Note that the condition of L2≤L1×3 is one of condition examples suitable for application of the present disclosure, and it is not intended to be limited to this condition.

Hereinafter, a specific configuration of the optical modulator according to the present disclosure will be described using an example. FIGS. 2 to 6 show structures of optical modulators according to first to fifth examples. An upper portion in each of the drawings is a plan view of a substrate of an optical waveguide element, and a lower portion is a cross-sectional view including a box-shaped housing accommodating the substrate. Basic structures of the optical modulators according to the respective examples are the same as that in the example of the related art described with reference to FIG. 1, and thus a description thereof will be omitted.

First Example

Figure 2:
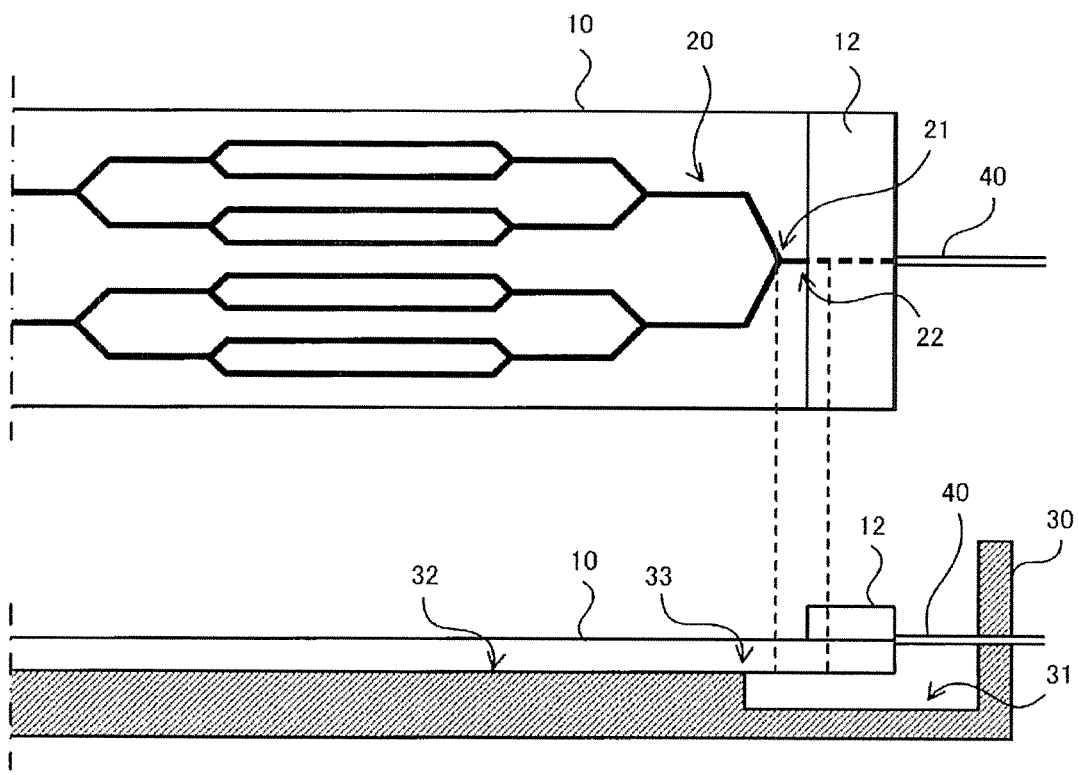
FIG. 2 is a diagram showing a structure of an optical modulator according to a first example of the present disclosure.

In the first example, as shown in the cross-sectional view which is the lower portion of FIG. 2, the substrate 10 is fixed to the mounting portion 32 in an arrangement in which the fixed end 33 on the light input portion side with respect to the mounting portion 32 provided on the bottom surface 31 of the housing 30 is positioned on a downstream side of a region including the Y branched waveguide portion 21 on the side furthest upstream in the light wave moving direction and the mode conversion portion 22 provided right before the Y branched waveguide portion. That is, a bottom surface side of a substrate region in which the mode conversion branching portions including the Y branched waveguide portion 21 and the mode conversion portion 22 are present is configured as a cavity. Regarding the depth of the cavity, a distance to such an extent that the bottom surface 31 of the housing does not come into contact with the substrate 10 in spite of deformation of the housing 30 should be able to be secured.

According to such a structure, the mode conversion branching portions do not directly receive an external force from the housing 30, and thus a point at which there is great change in stress (refractive index distribution) due to the external force from the housing does not occur within the range of the mode conversion branching portions. Therefore, a branching ratio of propagation light is stabilized when light waves are branched, and thus it is possible to reduce deterioration of an On/Off extinction ratio in the Mach-Zehnder waveguides and a loss difference between the branched waveguide portions.

Second Example

Figure 3:
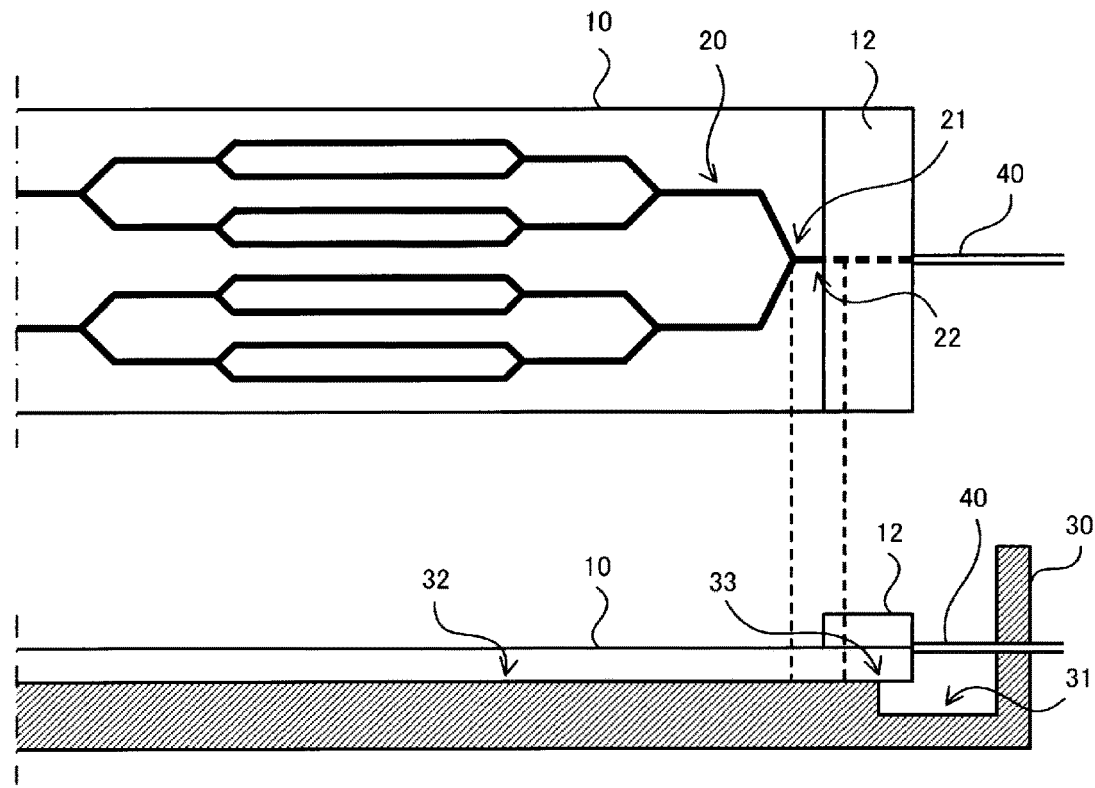
FIG. 3 is a diagram showing a structure of an optical modulator according to a second example of the present disclosure.

In the second example, as shown in the cross-sectional view which is the lower portion of FIG. 3, the substrate 10 is fixed to the mounting portion 32 in an arrangement in which the fixed end 33 on the light input portion side with respect to the mounting portion 32 provided on the bottom surface 31 of the housing 30 is positioned on an upstream side of a region including the Y branched waveguide portion 21 on the side furthest upstream in the light wave moving direction and the mode conversion portion 22 provided right before the Y branched waveguide portion. That is, the mounting portion 32 is extended to the light input portion side so that the fixed end 33 is positioned on the upstream side of the mode conversion portion 22.

According to such a structure, the mode conversion branching portions receive an external force due to deformation of the housing 30, but a point at which there is great change in stress does not occur within the range of the mode conversion branching portions. Therefore, a branching ratio of propagation light is stabilized when light waves are branched, and thus it is possible to reduce deterioration of an On/Off extinction ratio in the Mach-Zehnder waveguides and a loss difference between the branched waveguide portions.

Third Example and Fourth Example

Figure 4:
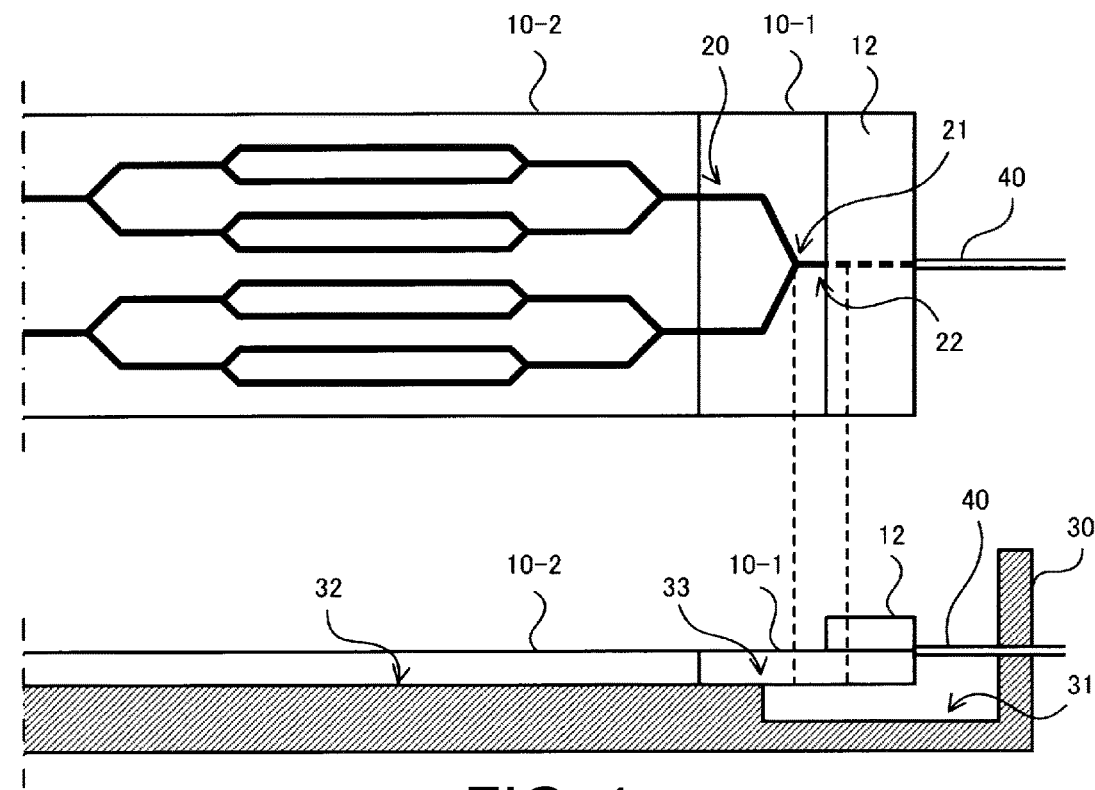
FIG. 4 is a diagram showing a structure of an optical modulator according to a third example of the present disclosure.
Figure 5:
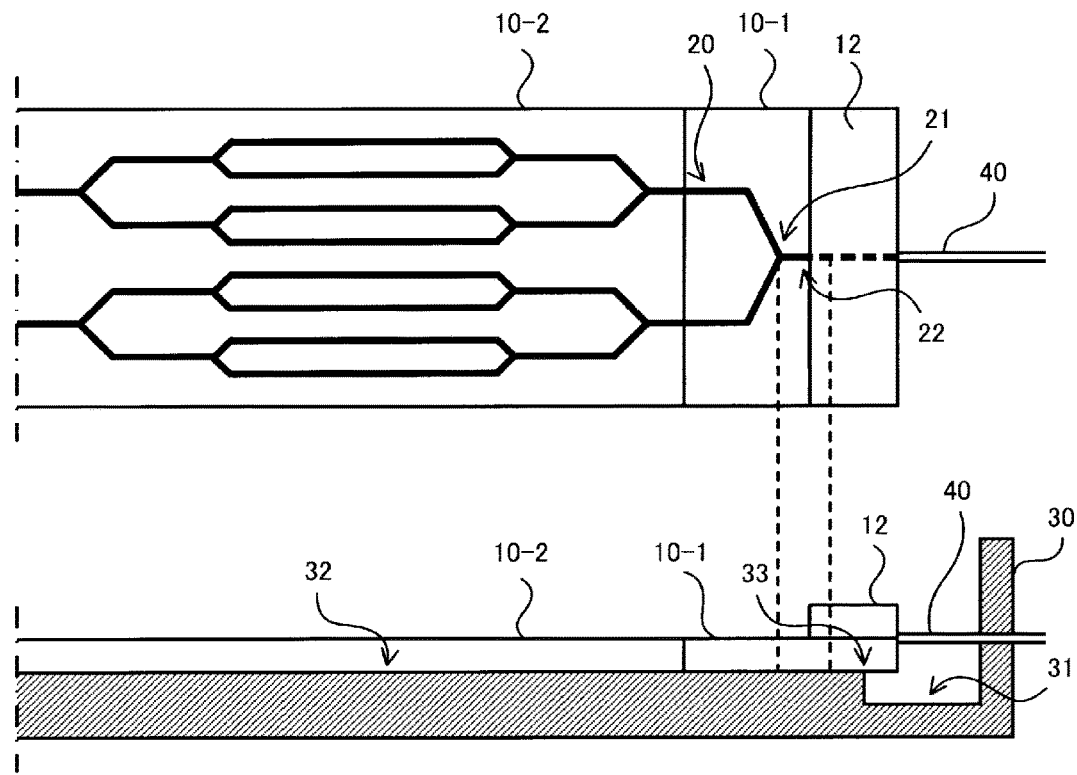
FIG. 5 is a diagram showing a structure of an optical modulator according to a fourth example of the present disclosure.

The third example shown in FIG. 4 is a modification example of the first example shown in FIG. 2. In addition, the fourth example shown in FIG. 5 is a modification example of the second example shown in FIG. 3. Although the optical waveguide element is formed of one type of substrate (for example, an LN substrate) in the first example and the second example, the optical waveguide element is formed of substrates of two types in the third example and the fourth example.

As shown in FIGS. 4 and 5, in these modification examples, the Y branched waveguide portion 21 on the side furthest upstream in the light wave moving direction and the mode conversion portion 22 provided right before the Y branched waveguide portion are formed on a substrate 10-1 of a first material, and the remaining optical waveguide portions are formed on a substrate 10-2 of a second material.

As an example, a planar lightwave circuit (PLC) substrate is used as the substrate 10-1. In addition, as an example, an LN substrate is used as the substrate 10-2. An optical waveguide formed on the substrate 10-1 and an optical waveguide formed on the substrate 10-2 are optically connected to each other. Also in an optical modulation element constituted by a plurality of substrates formed of different materials in this manner, it is possible to curb deterioration of transmission properties due to deformation of the housing by shifting the fixed end on a light input side with respect to the mounting portion of the substrate (particularly, the substrate 10-1 on the upstream side) from the range of the mode conversion branching portions.

Fifth Example

Figure 6:
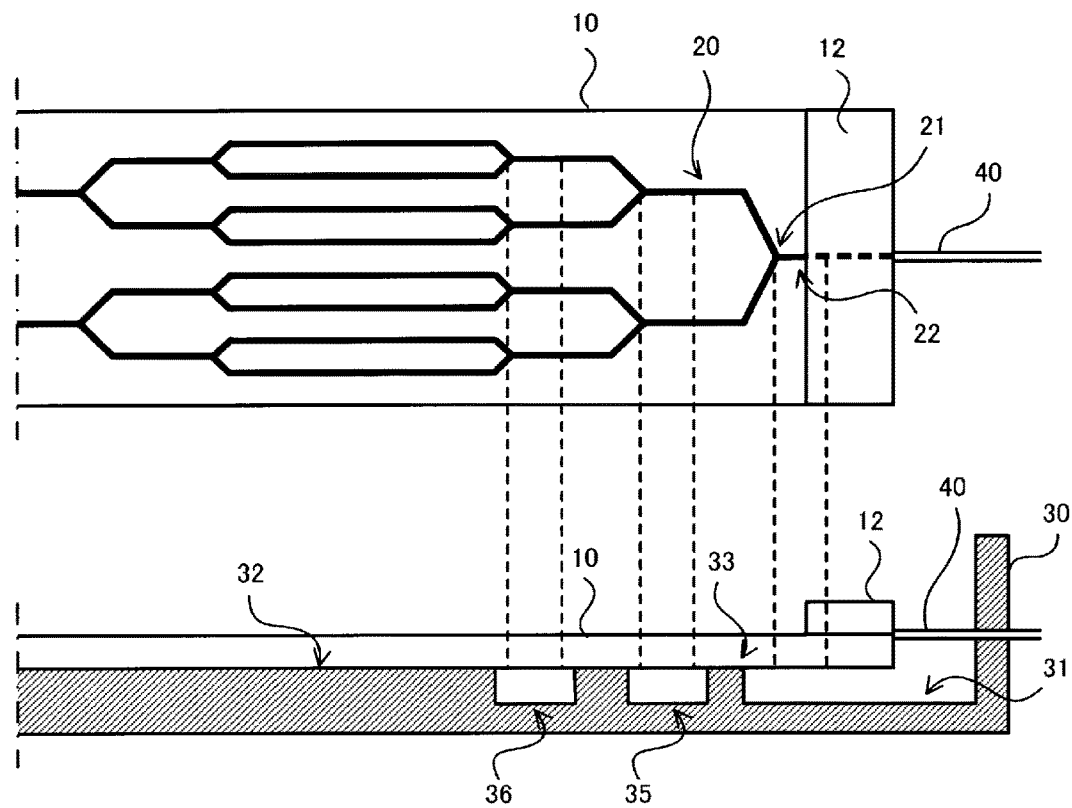
FIG. 6 is a diagram showing a structure of an optical modulator according to a fifth example of the present disclosure.

In the fifth example, as shown in the cross-sectional view which is the lower portion of FIG. 6, a plurality of concave portions 35 and 36 are formed in the mounting portion 32 provided on the bottom surface 31 of the housing 30. The concave portions 35 and 36 are formed in a groove shape on a planar mounting surface of the mounting portion 32 so as to extend in a direction perpendicular to the light wave moving direction. In addition, the concave portions 35 and 36 are formed such that a region of a mode conversion branching portion other than a mode conversion branching portion on the side furthest upstream in the light wave moving direction fits into each of the concave portions.

That is, similarly to the first example, a cavity is provided on the bottom surface side of the substrate region with respect to the other mode conversion branching portions closer to the center of the optical modulation element. Thereby, an effect of improving branching properties of light waves is obtained in the mode conversion branching portions other than the mode conversion branching portion on the side furthest upstream. In FIG. 6, two concave portions corresponding to the mode conversion branching portion at the second stage and the mode conversion branching portion at the third stage are provided in the mounting portion, but one concave portion corresponding to any one mode conversion branching portion may be provided in the mounting portion. In addition, also in a case where there is a mode conversion branching portion at the fourth stage or more, a concave portion may be provided for all of the second stage and the subsequent stages, or a concave portion may be selectively provided.

Note that it is also conceivable to form a continuous deep cavity from the light input portion side so that a cavity is formed below the substrate region with respect to all of the mode conversion branching portions, and in this case, a fixation area (the area of the mounting surface) of the substrate 10 is extremely reduced. This results in a deviation of an optical axis in a connection portion of an optical fiber and damage (cracking, bending, and the like of the substrate) of the optical modulation element. For this reason, as in this example, it is preferable to provide groove-like concave portions so that discrete cavities are formed.

While the present disclosure has been described above on the basis of the examples, the present disclosure is not limited to the above-described details and design changes can be made as appropriate without departing from the scope of the disclosure. For example, the substrate 10 has a single-layer structure of an LN substrate in each drawing. However, the substrate may be configured as a substrate having a multi-layer structure by bonding a thinned LN substrate to a reinforcing substrate directly or using an adhesive or the like or may be configured as a substrate having a multi-layer structure formed by crystal growth on a base substrate, and the present disclosure can be applied to any substrate. In addition, it is needless to say that the examples may be combined with each other as appropriate.

In the present disclosure, since a substrate of an optical modulator is fixed to a mounting portion in an arrangement in which a fixed end in a light wave moving direction with respect to the mounting portion is positioned outside a region including a mode conversion branching portion, it is possible to suppress deterioration of transmission properties due to deformation of a housing.

According to the present disclosure, it is possible to provide an optical modulator capable of curbing deterioration of transmission properties due to deformation of a housing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An optical modulator comprising:
a substrate on which an optical waveguide is formed; and
a housing which accommodates the substrate,
wherein the optical waveguide comprises a mode conversion branching portion that converts a mode of light waves propagating through the optical waveguide and branches the light waves,
a mounting portion protruding from a surface inside the housing and holding the substrate is formed, and
the substrate is fixed to the mounting portion in an arrangement in which a fixed end corresponding to a boundary of a bonding region in which the substrate and the mounting portion are bonded to each other is positioned outside a region including the mode conversion branching portion, when the substrate is seen in a plan view.
2. The optical modulator according to claim 1,
wherein the optical waveguide comprises a plurality of mode conversion branching portions, and
the substrate is fixed to the mounting portion in an arrangement in which a fixed end between the substrate and the mounting portion is positioned outside a region including a mode conversion branching portion on a side furthest upstream in a light wave moving direction, when the substrate is seen in a plan view.
3. The optical modulator according to claim 2,
wherein a concave portion extending in a direction perpendicular to the light wave moving direction is formed in the mounting portion, and
the concave portion is formed such that a region of any one mode conversion branching portion other than the mode conversion branching portion on the side furthest upstream in the light wave moving direction fits into the concave portion, when the substrate is seen in a plan view.

* * * * *